United States Patent Office 3,197,332
Patented July 27, 1965

3,197,332
WATER-RESISTANT POLYMERS OF
ETHYLENE OXIDE
Dennis C. Champ, Mount Royal, Montreal, Quebec, Canada, assignor to Union Carbide Canada Limited, Toronto, Ontario, Canada, a corporation of Canada
No Drawing. Filed Mar. 21, 1961, Ser. No. 97,140
8 Claims. (Cl. 117—138.8)

This invention relates to methods of making water-resistant high molecular weight polymers of ethylene oxide. More particularly it relates to methods achieving such water-resistant polymers by the use of silicones.

It is known to prepare water-soluble polymers comprising ethylene oxide which have a reduced viscosity in the range of from above about 1.0 and upwards to 25, and higher, by effecting the polymerization of ethylene oxide, alone, or in admixture with another alkylene oxide of 3 to 4 carbon atoms such as, for example, 1,2-propylene oxide, 1,2-epoxybutane, 2,3-epoxybutane, and the like. The preparation of these polymers and copolymers is described in detail in U.S. Patent No. 2,913,491 issued November 24, 1959 to Frederick E. Bailey. These polymers have molecular weights of from 80,000 up to 9 million or more.

By the term "reduced viscosity," as used herein, is meant a value obtained by dividing the specific viscosity by the concentration of the polymer is the solution, the concentration being measured in grams of polymer per 100 milliliters of solvent. The specific viscosity is obtained by dividing the difference between the viscosity of the solution and the viscosity of the solvent by the viscosity of the solvent. The reduced viscosity values of the polymers herein referred to are obtained by dissolving 0.2 gram of the polymer in question in 100 milliliters of acetonitrile at 30° C. It should be pointed out that the reduced viscosity values are an indication of molecular weight; the higher the reduced viscosity numerical value, the higher or greater the molecular weight of the polymer.

The ethylene oxide polymers, throughout the range of reduced viscosities from above about 1.0 to about 25, and higher, are water-soluble. They appear to form homogeneous systems with water in all proportions at room temperature. Although the higher molecular weight polymers merely swell on the addition of small amounts of water, on the addition of greater amounts of water, the polymers pass into solution. The water solutions are viscous, the viscosity increasing both with the concentration of the polymer in the solution and the reduced viscosity of the polymer. These homopolymers of ethylene oxide show little change in melting point with increased reduced viscosity (increased molecular weight) and the melting point, as measured by change in stiffness with temperature, is found to be about 65° ±2° C. throughout the range of reduced viscosities of from about 1.0 to 10, and higher. These homopolymers upon X-ray examination, show similar crystallinity to that exhibited by solid polyethylene. The crystallization temperature, as determined from measuring the break in the cooling curve, is about 55° C.

The ethylene oxide polymers which have a reduced viscosity of at least 1.0 are hard, tough, water-soluble materials. These polymers are useful for the production of films and various shaped articles. The copolymers, i.e., polymers comprising at least about 50 weight percent ethylene oxide (based on the weight of copolymer) and another lower alkylene oxide and the like are hard, solid, water-soluble materials from which can be made films and various shaped articles.

The term "ethylene oxide polymers" as used herein includes both the homopolymers and the copolymers described above. The characteristic property of dissolving in the presence of water which is possessed by these various polyethylene oxide polymers is no problem in many applications and is, in fact, an attribute in some cases. It would be desirable however to have a method for rendering films or shaped articles made from polyethylene oxide polymers water-resistant.

It is readily apparent, for example, that a sheet of polyethylene oxide which was untreated on one side but water impervious on the other would have uniquely desirable properties. From it could be fashioned an envelope with the water impervious side on the inside which could contain various liquid solutions sealed therein. The envelope could then be dropped into a container of water or other liquid in which the ethylene oxide polymers are soluble. The envelope would quickly dissolve and the contents of the envelope thus added to the contents of the container. Analogous expedients with shaped containers made of ethylene oxide polymers readily suggest themselves.

We have discovered that ethylene oxide polymers can be rendered water resistant by the application of a silicon compound coating. Only a relatively thin coating is required, which is not self sustaining. Thus if a sheet of ethylene oxide polymer is coated on one side with a silicon compound according to our invention the coated side of the sheet will be water resistant while if water is applied to the other side the entire sheet will collapse.

The silicon compounds useful for providing a water-resistant coating on polyethylene oxide polymers include monomeric and polymeric, as well as copolymeric materials. Thus for example we can use any of the hydrolyzable organic silanes which contain at least one non-hydrolyzable group and at least one hydrolyzable group, both bonded to the silicon atom of the silane. Such silanes may be represented by the formula:

wherein R represents an organic group, preferably a monovalent hydrocarbon group, including alkyl groups such as methyl, ethyl, propyl, butyl and amyl, aryl groups such as phenyl and substituted phenyl groups, and alkenyl groups such as vinyl and the like. In the formula X represents a hydrolyzable group such as halogen, i.e., chlorine, bromine, iodine, hydrocarbonoxy, i.e., alkoxy, amino and the like. In the formula $a$ is 1, 2 or 3, $b$ is 0, 1 or 2 and the value of 4 minus ($a$ plus $b$), $4-(a+b)$, is at least one.

Representative of such silanes are methyldichlorosilane, methylchlorosilane, dimethylchlorosilane, dimethyldichlorosilane, phenyltrichlorosilane, diphenyldichlorosilane, triphenylchlorosilane, ethyltribromosilane, diethyldibromosilane, triethylaminosilane, vinyltriethoxysilane, vinyldiethoxysilane, vinyl(ethyl)diaminosilane, methyl-(phenyl)dichlorosilane, beta-phenylethyltriphenoxysilane, amyltrifluorosilane, amyldifluorosilane, isobutylchlorosilane and the like.

Illustrative of the siloxanes that are useful in this invention are those that are composed of groups having the formula:

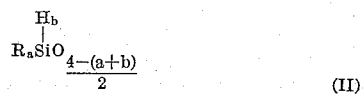

wherein R, $a$, $b$ and $(a+b)$ have the above-defined meanings. Illustrative of the groups represented by Formula II are methylsiloxy, dimethylsiloxy, trimethylsiloxy, methyl (hydrogen)siloxy [CH₃SiHO], phenylsiloxy, diphenylsiloxy, triphenylsiloxy, phenyl(hydrogen)siloxy

[C₆H₅SiHO]

ethyl(vinyl)siloxy, beta-phenylethylsiloxy, methyl(phenyl)siloxy, amylsiloxy, amyl(hydrogen)siloxy

[C₅H₉SiHO]

and vinylsiloxy groups and the like.

The siloxanes that are useful in this invention can include both homopolymeric siloxanes composed entirely of one of the groups represented by Formula II and copolymeric siloxanes that are composed of two or more groups of the type represented by Formula II. These various homopolymeric and copolymeric siloxanes can contain silicon-bonded alkoxy groups and/or hydroxy groups. The copolymers may also contain some SiO₂ groups.

Also useful in the invention are siloxane-oxyalkylene copolymers, some of which may be represented by the general formula:

$$(R')(SiO_3)_x(R_2SiO)_y[(C_nH_{2n}O)_zR'']_a[R''']_{3x-a} \quad (III)$$

wherein $x$ is an integer and represents the number of trifunctional silicon atoms bonded to a single monovalent or multivalent hydrocarbyl radical, $R'$; $a$ is an integer from 1 through 12 and represents the number of polyoxyalkylene chains in the block copolymer; $y$ is an integer having a value of at least 3 and denotes the number of difunctional siloxane units; $n$ is an integer from 2 to 4 denoting the number of carbon atoms in the oxyalkylene group; and $z$ is an integer having a value of at least 5 which denotes the length of the oxyalkylene chain. R and R'' represent monovalent hydrocarbyl radicals, such as alkyl, aryl aralkyl radicals, and R'' terminates a polyoxyalkylene chain with a monoether group. R''' is an alkyl radical or a trihydrocarbylsilyl radical and may terminate a siloxane chain, and R' represents a monovalent or polyvalent hydrocarbyl radical, being monovalent when $x$ is 1, divalent when $x$ is 2, trivalent when $x$ is 3 and tetravalent when $x$ is 4. The compositions employed according to the invention are mixtures of such block copolymers wherein $y$ and $z$ are of different values. Procedures suitable for the preparation of these copolymers of Formula III are described and claimed in U.S. Patent No. 2,834,748 issued May 13, 1958, to D. L. Bailey et al.

Other typical siloxane-oxyalkylene copolymers may be represented by the general formula:

$$R'[(R_2SiO)_y]_a[(C_nH_{2n}O)_x]_bR'' \quad (IV)$$

wherein R is a hydrocarbon radical such as alkyl, chlorinated alkyl, aryl, aralkyl or the like. R' and R'' are chain-terminating monovalent hydrocarbyl or hydrocarbyloxy radicals and may terminate a siloxane chain either by a hydrocarbyloxy group or by completing a trihydrocarbylsilyl group and may terminate an oxyalkylene chain with a hydrocarbyloxy group. In the formula $n$ is an integer from 2 to 4 and $a$ and $b$ are integers whose sum is 2 or 3, $x$ is an integer having a value of at least 5 and $y$ is an integer having a value of at least 2. Compositions of this formula include mixtures where $x$ and $y$ are of different values. Procedures suitable for the preparation of these copolymers of Formula IV are described and claimed in U.S. Patent No. 2,917,480 issued December 15, 1959 to D. L. Bailey et al.

With respect to all of the above-described materials it should be noted that any of the polymeric materials can obtain small amounts of silicon-bonded hydroxyl and/or alkoxy groups.

Also useful in the invention are siloxane-oxyalkylene block copolymers containing at least one siloxane block and at least one oxyalkylene block wherein the siloxane block contains at least two siloxane groups of the formula:

$$R_bSiO_{\frac{4-b}{2}} \quad (V)$$

wherein R is a monovalent or divalent hydrocarbon group and preferably has from 1 to 12 carbon atoms. It may be alkenyl, i.e. vinyl or allyl; cycloalkenyl, i.e., cyclohexenyl; alkyl, i.e., methyl, ethyl, isopropyl, dodenyl; aryl, i.e., phenyl, naphthyl; aralkyl, i.e., benzyl, phenylethyl; alkaryl, i.e., styrl, tolyl, n-hexylphenyl; cycloalkyl, i.e., cyclohexyl; alkylene, i.e., methylene, ethylene, propylene, butylene, 2,2 - dimethyl-1,3 - propylene, decylene; arylene, i.e., phenylene, alkarylene, i.e., phenylethylene, or the like, and $b$ is an integer having a value from 1 to 3. The R groups can be the same or different in any group or throughout the block and $b$ can vary from group to group. The divalent R groups, at least one of which must present in each siloxane block, link the siloxane block to the oxyalkylene block.

The oxyalkylene block in these copolymers must contain at least one four oxyalkylene groups represented by the formula [—R'O—] wherein R' is an alkylene group. Preferably the alkylene group contains from 2 to 10 carbon atoms and most preferably from 2 to 3 carbon atoms. Typical suitable oxyalkylene groups include oxyethylene, oxy-1,2-propylene, oxy-1,3-propylene, oxy-2,2-dimethyl-1,3-propylene; 1,10-decylene and the like. These siloxanes can also contain silicon-bonded alkoxy groups and/or hydroxy groups and SiO₂ groups.

It is to be understood that mixtures of more than one type of silicon compound can be employed in the invention. While the invention is not to be limited by any particular theory of the mechanism involved, it appears likely that an association or bond is formed between the ethylene oxide polymer and the silicon compound applied thereto.

In the practice of the invention the silicon compounds can be applied to the ethylene oxide polymer in any convenient manner, as by spraying, dipping, flooding, brushing and the like. While the silicon compounds can be applied alone, it has been found that a more uniform coating can be assured by applying the silicon compound as a solution or dispersion in a volatile solvent or dispersant. Suitable volatile solvents include the saturated and unsaturated hydrocarbons, i.e., heptane, cyclohexane, heptene, mineral spirits (i.e., volatile hydrocarbons derived from low boiling petroleum fractions), toluene, xylene, tetra hydronaphthalene, decahydronaphthalene, and the like; the halogenated hydrocarbons, e.g., chlorobenzene, chloroform, carbontetrachloride, trichloroethylene, dichloroethylether, and the like; the nitrogenated paraffins, e.g., nitropropane, hydrocarbon ether, e.g., isopropyl ether, diphenyl ether, dioxane, and the like; hydrocarbon alcohols and hydrocarbon alcohol-ethers, e.g., ethanol, butanol, ethylene glycol, diethylene glycol, and the monoalkyl ethers of alkylene glycols such as the monoalkyl ethers of ethylene, diethylene, propylene and dipropylene glycol, monomethyl ether of ethylene glycol, mixtures thereof, and the like.

Preferably the coating of silicon compound, whether applied alone or from a solvent or dispersant, is dried after application. Drying can be accelerated by warming the coated film, with care being taken to insure that the temperature of heating is not high enough to disorient or otherwise impair the qualities of the ethylene polymer film. Depending on the particular film the temperature should not exceed 50° C. to 70° C.

Drying and attendant curing of the coating can also be accelerated by the use of catalysts, either alone or in conjunction with heat. The catalyst is ordinarily mixed with the silicon compound before coating the ethylene oxide polymer film. Suitable catalysts include organic salts of certain reactive metals such as cobalt, lead, zinc, iron and tin, for example zinc naphthenate, cobalt naphthenate, iron octoate and dibutyltin dilaurate. Also useful are titanates such as: tetra-isopropyl titanate, teara-n-butyl titanate, tetra-2-ethylhexyl titanate, tetra-stearyl titanate, octylene glycol titanate, triethanol amine titanate, triethanol amine titanate-N-salts, titanium lactate, titanium acetyl acetonate, titanium stearate, titanium oleate, titanium soy acrylate, isopropoxy titanium stearates and the like.

It is within the scope of the invention to mix with the silicon compounds before coating various modifiers and additives such as zinc mordant, including those which themselves have some water-repellant properties. Pigments can also be added to the silicon compounds. Suitable pigments include both natural and synthetic inorganic pigments of the types of umber, sienna, ochre, aluminum, and the like, and chrome greens, iron blues, iron oxide browns and reds, zinc whites, titanium whites, ultramarine blue, lead chromate yellows, zinc chromate yellows, cadmium reds, carbon blacks, and the like; and natural and synthetic organic pigments of the types of carmine, catechu, tumeric, fustic, logwood, and the like, and naphthol yellows, azo reds, lithol reds, azo oranges, indanthrene blues, indanthrene violets, toluidene yellows, phthalocyanine blues, and the like.

*Example I*

An 0.002 inch thick sheet of ethylene oxide polymer film having a reduced viscosity of about 6 and an average molecular weight of about 500,000 was found to disintegrate almost instantaneously when water was applied to its surface. A sheet of the film was then sprayed on one side with a silicon compound formulation until the one side of the sheet was uniformly coated. After drying in air the coated sheet was found to be impervious to water on the coated side. When water was applied to the uncoated side however the entire sheet rapidly disintegrated. The silicon compound formulation employed was an aerosol spray consisting of, in parts by weight, 15 parts dimentyl silicone oil of 10,000 centistokes viscosity, 3.75 parts of a mono-amyl polysiloxane with reactive ethoxy end-block groups, 6.25 parts of tetraisopropyl titanate and 75 parts of perchloroethylene, plus a Freon propellant.

*Example II*

An 0.002 inch thick sheet of ethylene oxide polymer film having a reduced viscosity of about 6 and an average molecular weight of about 500,000 was found to disintegrate almost instantly when water was applied to the surface. A piece of absorbent paper was soaked in a silicone fluid and then used to apply the fluid to one side of a sheet of the ethylene oxide film. Water was then applied to the coated side of the film and it was found to be water impervious in all areas where a uniform coating of the silicone fluid had been achieved. Water was then applied to the uncoated side of the film and the entire film then disintegrated. The silicone fluid used was a dimethyl polysiloxane oil end-blocked with trimethyl siloxy units. Measured at a temperature of 25° C. it had a viscosity of 100 centistokes and a specific gravity of 0.970.

What is claimed is:

1. A substrate of ethylene oxide polymer having a reduced viscosity of at least 1.0, the surface on one side of said substrate being coated with a water-insoluble non-self sustaining coating of an organosilicon compound and at least a portion of the surface on the other side of said substrate being free of coating, said coated substrate being susceptible of disintegrating in water when water contacts the uncoated surface portion oppositely disposed to the coated surface of said substrate.

2. A sheet of ethylene oxide polymer having a reduced viscosity of at least 1.0, the surface on one side of said sheet being coated with a water-insoluble, non-self sustaining coating of a organosilicon compound and at least a portion of the surface on the other side of said sheet being free of coating, said coated sheet being susceptible of disintegrating in water when water contacts the uncoated surface portion oppositely disposed to the coated surface of said substrate.

3. A shaped article of ethylene oxide polymer having a reduced viscosity of at least 1.0, the surface on one side of said shaped article being coated with a water-insoluble, non-self sustaining coating of an organosilicon compound and at least a portion of the surface on the other side of said article being free of coating, said coated article being susceptible of disintegrating in water when water contacts the uncoated surface portion oppositely disposed to said coated surface of said article.

4. A substrate of ethylene oxide polymer having a reduced viscosity of at least 1.0, the surface on one side of said substrate being coated with a water insoluble, non-self sustaining coating of a silane polymer containing groups represented by the formula:

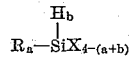

wherein R is an organic group, X is a hydrolyzable group, $a$ is an integer from 1 through 3, $b$ is an integer from 0 through 2, and the sum of $4-(a+b)$ is at least one and at least a portion of the surface on the other side of said substrate being free of coating, the coated substrate being susceptible of disintegrating in water when water contacts the uncoated surface portion oppositely disposed to the coated surface of said substrate.

5. A substrate of ethylene oxide polymer having a reduced viscosity of at least 1.0, the surface on one side of said substrate being coated with a water-insoluble, non-self sustaining coating of a siloxane polymer containing groups represented by the formula:

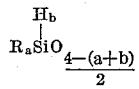

wherein R is an organic group, $a$ is an integer from 1 through 3, $b$ is an integer from 0 through 2, and the sum of $4-(a+b)$ is at least one and at least a portion of the surface on the other side of said substrate being free of coating, the coated substrate being susceptible of disintegrating in water when water contacts the uncoated surface portion oppositely disposed to the coated surface of said substrate.

6. A substrate of ethylene oxide polymer having a reduced viscosity of at least 1.0, the surface on one side of said substrate being coated with a water-insoluble, non-self sustaining coating of a siloxane-oxyalkylene copolymer represented by the general formula:

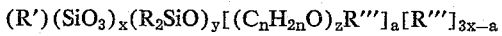

wherein R and R″ are monovalent hydrocarbyl radicals, R′ is a hydrocarbyl radical having a valence from 1 to 4, R‴ is selected from the group consisting of an alkyl radical and trihydrocarbylsilyl, $x$ is an integer from 1 to 4, $a$ is an integer from 1 through 12, $y$ is an integer having a value of at least 3, $z$ is an integer having a value of at least 5, $y$ and $z$ have different values and $n$ is an integer from 2 to 4 and at least a portion of the surface on the other side of said substrate being free of coating, the coated substrate being susceptible of disintegrating in water when water contacts the uncoated surface portion oppositely disposed to the coated surface of said substrate.

7. A substrate of ethylene oxide polymer having a reduced viscosity of at least 1.0, the surface on one side of said substrate being coated with a water-insoluble, non-self sustaining coating of a siloxane-oxyalkylene copolymer represented by the general formula:

wherein R′ and R″ are selected from the group consisting of monovalent hydrocarbyl and monovalent hydrocarbyloxy radicals, R is a hydrocarbon radical, $y$ is an integer having a value of at least 2, $x$ is an integer having a value of at least 5, $a$ and $b$ are integers whose sum is 2 through 3 and $n$ is an integer from 2 to 4 and at least a portion of the surface on the other side of said substrate being free of coating, the coated substrate being susceptible of disintegrating in water when water contacts the uncoated surface portion oppositely disposed to the coated surface of said substrate.

8. A substrate of ethylene oxide polymer having a reduced viscosity of at least 1.0, the surface on one side of said substrate being coated with a water-insoluble, non-self sustaining coating of a siloxane-oxyalkylene block copolymer containing at least one siloxane block and at least one oxyalkylene block, said siloxane block containing at least two siloxane groups of the formula:

$$R_b SiO_{\frac{4-b}{2}}$$

wherein R is a hydrocarbon group having a valence from 1 through 2 and $b$ is an integer from 1 through 3, at least one R being divalent, and said oxyalkylene block containing at least 4 oxyalkylene groups represented by the formula:

$$[-R'O-]$$

R' being an alkylene group, said oxyalkylene block being connected to siloxane block through said divalent hydrocarbon group R and at least a portion of the surface on the other side of said substrate being free of coating, the coated substrate being susceptible of disintegrating in water when water contacts the uncoated surface oppositely disposed to the coated surface of said substrate.

References Cited by the Examiner

UNITED STATES PATENTS

| | | | |
|---|---|---|---|
| 2,512,192 | 6/50 | Yen et al. | 167—82 |
| 2,699,402 | 1/55 | Meyer | 117—72 |
| 2,864,722 | 12/58 | Millar et al. | 117—72 |
| 2,869,722 | 1/59 | Marander et al. | 206—84 |
| 3,003,992 | 10/61 | Mabrey et al. | 117—161 |
| 3,030,234 | 4/62 | McClinton | 117—138.8 |
| 3,055,433 | 9/62 | Hiltpold et al. | 167—82 |

RICHARD D. NEVIUS, *Primary Examiner.*